United States Patent
Lee et al.

(10) Patent No.: US 11,743,811 B2
(45) Date of Patent: Aug. 29, 2023

(54) APPARATUS AND METHOD FOR MANAGING USER PLANE FUNCTION IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR); Varini Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 17/304,640

(22) Filed: Jun. 23, 2021

(65) Prior Publication Data

US 2021/0400576 A1 Dec. 23, 2021

(30) Foreign Application Priority Data

Jun. 23, 2020 (IN) .............................. 202031026470

(51) Int. Cl.
*H04W 48/18* (2009.01)
*H04W 8/06* (2009.01)
*H04W 84/04* (2009.01)

(52) U.S. Cl.
CPC ............. *H04W 48/18* (2013.01); *H04W 8/06* (2013.01); *H04W 84/042* (2013.01)

(58) Field of Classification Search
None
See application file for complete search history.

(56) References Cited

U.S. PATENT DOCUMENTS

| 10,506,506 | B2 * | 12/2019 | Qiao | H04W 48/18 |
| 2018/0227873 | A1 * | 8/2018 | Vrzic | H04W 28/26 |
| 2018/0317163 | A1 * | 11/2018 | Lee | H04W 48/18 |
| 2019/0335392 | A1 * | 10/2019 | Qiao | H04W 48/18 |
| 2020/0037386 | A1 * | 1/2020 | Park | H04W 80/10 |
| 2020/0137675 | A1 | 4/2020 | Park et al. | |

(Continued)

FOREIGN PATENT DOCUMENTS

| EP | 3846554 A1 | 7/2021 |
| KR | 10-2020-0037675 A | 4/2020 |
| WO | WO-2021236913 A1 * | 11/2021 |

OTHER PUBLICATIONS

Procedures for the 5G System (3GPP TS 23.502 version 15.2.0 Release 15) Jun. 2018 (Year: 2018).*

(Continued)

*Primary Examiner* — Brian D Nguyen

(57) ABSTRACT

In accordance with an embodiment of the disclosure, a method performed, by an access and mobility management function (AMF), in a wireless communication system, the method comprising receiving, from a user equipment (UE) with a packet data network (PDN) connection established, a registration request message including a first single-network slice selection assistance information (S-NSSAI) associated with the PDN connection, determining a second S-NSSAI associated with a packet data unit (PDU) session corresponding to the PDN connection based on the first S-NSSAI, and transmitting an information regarding the second S-NS-SAI to a user plane function (UPF) via a session management function (SMF) to request modification of N4 session.

15 Claims, 12 Drawing Sheets

(56) References Cited

U.S. PATENT DOCUMENTS

| | | |
|---|---|---|
| 2020/0163010 A1 | 5/2020 | Qiao et al. |
| 2020/0196169 A1* | 6/2020 | Dao et al. |
| 2020/0314701 A1* | 10/2020 | Talebi Fard ...... H04W 36/0033 |
| 2021/0153006 A1* | 5/2021 | Kim ........................ H04W 8/08 |
| 2021/0153157 A1* | 5/2021 | Jeong ...................... H04W 8/20 |
| 2021/0153268 A1* | 5/2021 | Lee ........................ H04W 12/06 |
| 2021/0368325 A1* | 11/2021 | Lee ....................... H04W 8/082 |
| 2022/0377656 A1* | 11/2022 | Kuge .................... H04W 48/18 |

OTHER PUBLICATIONS

International Search Report and Written Opinion of the International Searching Authority dated Oct. 7, 2021, in connection with International Application No. PCT/KR2021/007891, 9 pages.

3GPP TR 23.700-40 V0.4.0 (Jun. 2020), Technical Report, 3rd Generation Partnership Project; Technical Specification Group Services and System Aspects; Study on enhancement of network slicing; Phase 2 (Release 17), Jun. 2020, 143 pages.

* cited by examiner

APPARATUS AND METHOD FOR MANAGING USER PLANE FUNCTION IN WIRELESS COMMUNICATION SYSTEM

CROSS-REFERENCE TO RELATED APPLICATION

This application is based on and claims priority under 35 U.S.C. § 119 to Indian Patent Application No. 202031026470, filed on Jun. 23, 2020, in the Indian Intellectual Property Office, the disclosure of which is incorporated by reference herein in its entirety.

BACKGROUND

1. Field

The disclosure relates to an apparatus and method for controlling a user plane function in a wireless communication system.

2. Description of Related Art

To meet increasing demand with respect to wireless data traffic after the commercialization of 4th generation (4G) communication systems, efforts have been made to develop evolved 5th generation (5G) system or pre-5G communication system. For this reason, 5G or pre-5G communication systems are called 'beyond 4G network' communication systems or 'post long term evolution (post-LTE)' systems.

To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system.

To improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied.

In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply the 5G communication system to the IoT network. For example, sensor networks, M2M communication, MTC, or the like are being implemented by using the 5G communication techniques including beamforming, MIMO, array antennas, or the like. Application of cloud radio access network (Cloud-RAN) as the above-described big data processing technology may be an example of convergence of 5G communication technology and IoT technology.

SUMMARY

In accordance an embodiment of the disclosure, a method performed, by an access and mobility management function (AMF), in a wireless communication system, the method comprising receiving, from a user equipment (UE) with a packet data network (PDN) connection established, a registration request message including a first single-network slice selection assistance information (S-NSSAI) associated with the PDN connection, determining a second S-NSSAI associated with a packet data unit (PDU) session corresponding to the PDN connection based on the first S-NSSAI, and transmitting an information regarding the second S-NSSAI to a user plane function (UPF) via a session management function (SMF) to request modification of N4 session.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
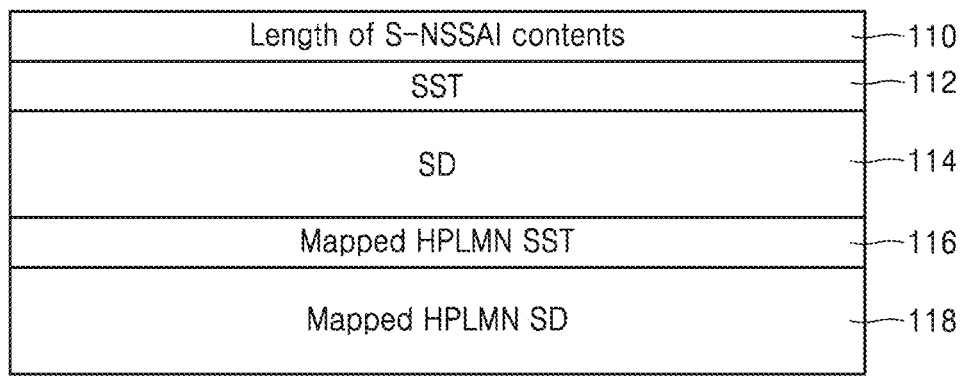
FIG. 1 is a diagram illustrating an example of a configuration of a Single-Network Slice Selection Assistance Information (S-NSSAI) information element (IE), according to an embodiment of the disclosure.

Hereinafter, operation principles of the disclosure will be described in detail with reference to accompanying drawings.

In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor.

Hereinafter, terms identifying an access node, terms indicating signals, terms indicating channels, terms indicating control information, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of description, the disclosure uses terms and names defined in the 3rd Generation Partnership Project (3GPP) long term evolution (LTE) standards. However, the disclosure is not limited to these terms and names, and may be equally applied to communication systems conforming to other standards.

Although embodiments of the disclosure are described by using communication systems following the 3GPP standard, it will be understood by one of ordinary skill in the art that the main essence of the disclosure may also be applied to other communication systems having a similar technical background through some modifications without departing from the scope of the disclosure.

In the 3GPP standards, 5G network system architectures and procedures are standardized. A mobile communication network operator may provide various services in a 5G network. In order to provide each service, the mobile communication network operator may have to satisfy different service requirements (e.g., latency, communication range, data rate, bandwidth, reliability, etc.). To this end, the mobile communication network operator may configure network slices, and may allocate an appropriate network resource for a particular service according to each of the network slices or according to a set of a network slice. In this regard, the network resource may indicate a network function (NF), a logical resource provided by the NF, or radio resource allocation by a base station (BS).

For example, the mobile communication network operator may configure a network slice A to provide a mobile broadband service, may configure a network slice B to provide a vehicle communication service, and may configure a network slice C to provide an Internet of things (IoT) service. That is, in the 5G network, each service may be provided on a dedicated network slice according to features of each service. As a differentiator for differentiating network slices, Single-Network Slice Selection Assistance Information (S-NSSAI) defined in the 3GPP may be used.

Hereinafter, the disclosure relates to an apparatus and method for providing a network slice in a wireless communication system. In particular, the disclosure relates to a technology of controlling and managing a user plane function in a mobile communication network system providing a network slice function in the wireless communication system.

FIG. 1 is a diagram illustrating an example of a configuration of an S-NSSAI information element (IE).

S-NSSAI may include at least one of a Slice/Service Type (SST) 116 used in a Home Public Land Mobile Network (Home PLMN or HPLMN), a Slice Differentiator (SD) 118 used in the HPLMN, a SST 112 used in a serving PLMN, or an SD 114 used in the serving PLMN.

In a non-roaming situation, the SST 112 used in the serving PLMN may be the SST 116 used in the HPLMN, and the SD 114 used in the serving PLMN may be the SD 118 used in the HPLMN.

In a roaming situation, the SST 112 used in the serving PLMN may be an SST used in a visited PLMN (VPLMN), and the SD 114 used in the serving PLMN may be an SD used in the VPLMN.

Each of SSTs and each of SDs configuring one S-NSSAI may have a value or a null value.

NSSAI may consist of one or more pieces of S-NSSAI. An example of NSSAI may include Configured NSSAI stored in a UE, Requested NSSAI requested by the UE, Allowed NSSAI allowed for the UE to use the same by an NF (e.g., an Access and Mobility Management Function (AMF), a Network Slice Selection Function (NSSF), etc.) of a 5G core network (5GC), and Subscribed NSSAI to which the UE subscribes, but this is merely exemplary and the example of NSSAI is not limited thereto.

A mobile communication network operator may operate both the 5G network and the Evolved Packet System (EPS) (or LTE) network. In this case, a mobile communication terminal may access the 5G network and use a service and then may switch to the EPS network. Alternatively, the mobile communication terminal may access the EPS network and use a service and then may switch to the 5G network. The switching thereof may be referred to as Evolved Packet Core (EPC) inter-working.

Also, the mobile communication network operator may inter-connect a first 5G network with a second 5G network. The mobile communication terminal may access the first 5G network (a first PLMN) and use a service and then may switch to the second 5G network (a second PLMN). The switching thereof may be referred to as inter-PLMN mobility.

Figure 2:
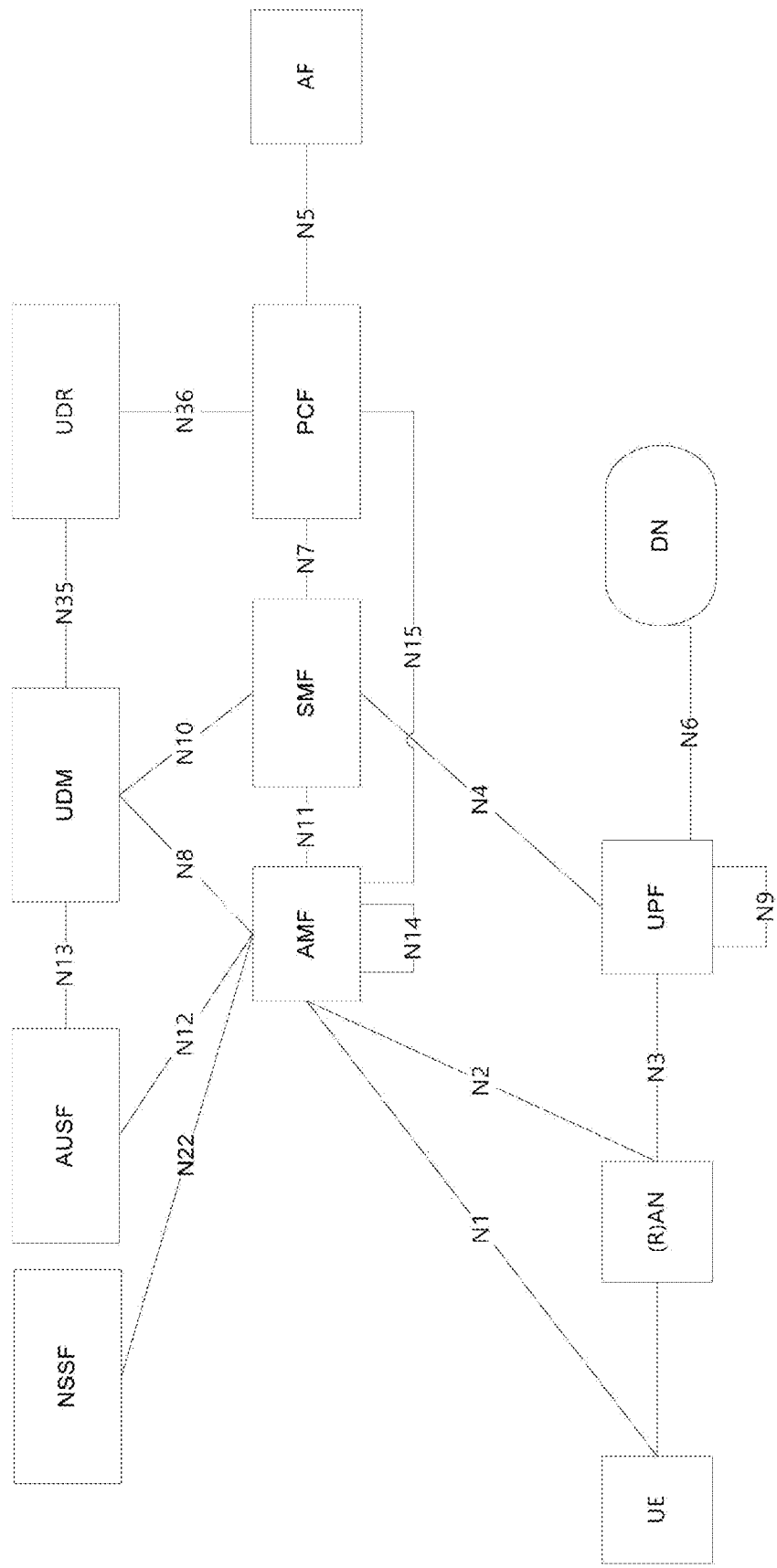
FIG. 2 illustrates architecture of a mobile communication system, according to an embodiment of the disclosure.

FIG. 2 illustrates architecture of a mobile communication system according to an embodiment of the disclosure.

The 5G system (5GS) may include a New Radio (NR) BS (NG-RAN), an Access and Mobility Management Function (AMF), a Session Management Function (SMF), a User Plane Function (UPF), a Policy Control Function (PCF), and Unified Data Management. The EPS may include an Evolved Universal Terrestrial Radio Access (E-UTRA) BS (Evolved Universal Terrestrial Radio Access Network (E-UTRAN)), a Mobility Management Entity (MME), a Serving Gateway (SGW), a Packet Gateway-User plane (PGW-U), a Packet Gateway-Control plane (PGW-C), a policy and charging rules function (PCRF), and a Home Subscriber Server (HSS) FIG. 2 will now be described with reference to the 5GS.

Referring to FIG. 2, the 5GC may include an AMF, an SMF, a UPF, a PCF, UDM, a Network Slice Selection Function (NSSF), an Authentication Server Function (AUSF), a Unified Data Repository (UDR), or the like. A terminal may access the 5GC via a (radio) access network ((R)AN). Hereinafter, the terminal may be referred to as the UE, and the (R)AN may be referred to as the BS. The 5GC may further include an Application Function (AF) and a Data Network (DN).

In an embodiment of the disclosure, the AMF is an NF that manages wireless network access and mobility with respect to the UE.

The SMF is an NF that manages a session with respect to the UE, and session information includes Quality of Service (QoS) information, charging information, packet processing information, or the like.

The UPF is an NF that processes user traffic (e.g., user plane traffic) and is controlled by the SMF.

The PCF is an NF that manages an operator policy (i.e., a PLMN policy) for providing a service in a wireless communication system. In addition, the PCF may be divided into a PCF that manages an access and mobility (AM) policy and a UE policy, and a PCF that manages a session management (SM) policy. The PCF managing the AM/UE policies and the PCF managing the SM policy may be NFs that are logically or physically separate from each other or may be logically or physically one NF.

The UDM is an NF that stores and manages UE subscription information.

The UDR is an NF or a database (DB) that stores and manages data. The UDR may store UE subscription information and may provide the UE subscription information to the UDM. Also, the UDR may store operator policy information and may provide the operator policy information to the PCF.

The NSSF may be an NF that performs a function of selecting network slice instances for servicing the UE or a function of determining NSSAI.

The AUSF may be an NF that performs a function of supporting authentication for 3GPP access and non-3GPP access.

The AF may be an NF that provides a function for a service according to an embodiment of the disclosure.

A DN may denote a data network capable of providing an operator service, an internet access, a 3rd party service, or the like.

Figure 3:
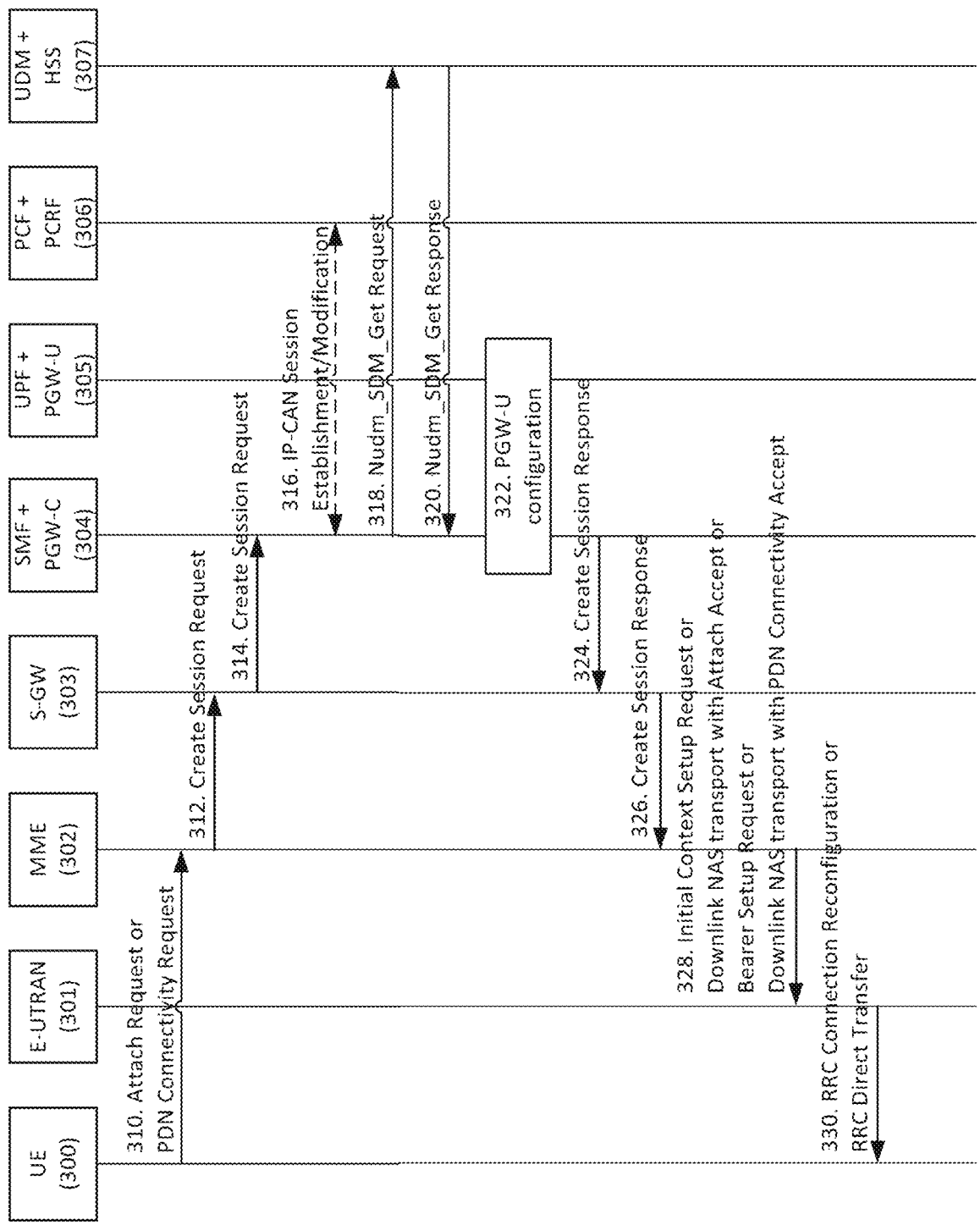
FIG. 3 illustrates a connection generation procedure in an interworking structure between a 5th generation system (5GS) and an Evolved Packet System (EPS), according to an embodiment of the disclosure.

FIG. 3 illustrates a connection generation procedure in an interworking structure between the 5GS and the EPS, according to an embodiment of the disclosure.

Referring to FIG. 3, the UDM of the 5GS and the HSS of the EPS may be configured as a UDM+HSS node 307 that is one combo node. Also, the SMF of the 5GS and the PGW-C of the EPS may be configured as SMF+PGW-C 304 that is one combo node. The UDM+HSS node 307 may store UE subscription information. Also, the UPF of the 5GS and the PGW-U of the EPS may be configured as UPF+PGW-U 305 that is one combo node. Also, the PCF of the 5GS and the PCRF of the EPS may be configured as PCF+PCRF 306 that is one combo node combo.

Referring to FIG. 3, a UE 300 may establish Packet Data Network (PDN) connection by accessing an MME 302 of the EPS via an E-UTRAN 301, and then may use an EPS network service.

In operation 310, the UE 300 may transmit an Attach Request or PDN Connectivity Request message to the MME 302 via the E-UTRAN 301. The Attach Request or PDN Connectivity Request message may include data network name (DNN) information.

In operation 312, the MME 302 may transmit a Create Session Request message to an S-GW 303. The Create Session Request message may include DNN information.

In operation 314, the S-GW 303 may transmit a Create Session Request message to the SMF+PGW-C 304. The Create Session Request message may include DNN information.

In operation 316, the SMF+PGW-C 304 and the PCF+PCRF 306 may perform an Internet Protocol-connectivity access network (IP-CAN) Session Establishment or IP-CAN Session Modification procedure. The SMF+PGW-C 304 may receive policy information from the PCF+PCRF 306. The policy information may include policy information related to network slice information (e.g., at least one S-NSSAI) that is usable by the UE 300.

In operation 318, the SMF+PGW-C 304 may request the UDM+HSS node 307 for UE subscription information.

In operation 320, the SMF+PGW-C 304 may receive the UE subscription information from the UDM+HSS node 307. The UE subscription information may include policy information related to network slice information (e.g., at least one S-NSSAI) that is usable by the UE 300.

The SMF+PGW-C 304 according to an embodiment of the disclosure may determine S-NSSAI associated with PDN connection, based on at least one of local configuration of the SMF+PGW-C 304, an operator policy of the SMF+PGW-C 304, information (e.g., the DNN information, etc.) received in operation 314, information (e.g., the policy information related to S-NSSAI, etc.) received in operation 316, or information (e.g., subscription information related to S-NSSAI, etc.) received in operation 320.

The SMF+PGW-C 304 according to another embodiment of the disclosure may determine S-NSSAI associated with PDN connection, based on at least one of the local configuration of the SMF+PGW-C 304, the operator policy of the SMF+PGW-C 304, or the information (e.g., the DNN information, etc.) received in operation 314. The SMF+PGW-C 304 may transmit the determined S-NSSAI to the PCF+PCRF 306. In an embodiment of the disclosure, the PCF+PCRF 306 may store the received S-NSSAI. A procedure in which the SMF+PGW-C 304 transmits the determined S-NSSAI to the PCF+PCRF 306 may be performed in operation 316. The SMF+PGW-C 304 may transmit the determined S-NSSAI to the UDM+HSS node 307. In an embodiment of the disclosure, the UDM+HSS node 307 may store the received S-NSSAI. A procedure in which the SMF+PGW-C 304 transmits the determined S-NSSAI to the UDM+HSS node 307 may be performed in operation 318.

In a case where the connection generation procedure of FIG. 3 occurs in a non-roaming situation, the S-NSSAI determined by the SMF+PGW-C 304 may include at least one of the SST 112 of the serving PLMN, the SD 114 of the serving PLMN, the HPLMN SST 116, or the HPLMN SD 118. In an embodiment of the disclosure, the SST 112 of the serving PLMN which is included in the S-NSSAI may be the HPLMN SST. Also, the SD 114 of the serving PLMN which is included in the S-NSSAI may be the HPLMN SD.

In a case where the connection generation procedure of FIG. 3 occurs in a local breakout roaming situation, the S-NSSAI determined by the SMF+PGW-C 304 may include at least one of the SST 112 of the serving PLMN or the SD 114 of the serving PLMN. In an embodiment of the disclosure, the SST 112 of the serving PLMN which is included in the S-NSSAI may be the VPLMN SST. The SD 114 of the serving PLMN which is included in the S-NSSAI may be the VPLMN SD. The S-NSSAI may not include the HPLMN SST 116 and the HPLMN SD 118.

In a case where the connection generation procedure of FIG. 3 occurs in a home routed roaming situation, the S-NSSAI determined by the SMF+PGW-C 304 may include at least one of the HPLMN SST 116 or the HPLMN SD 118. In an embodiment of the disclosure, the HPLMN SST 116 included in the S-NSSAI may be the HPLMN SST. The HPLMN SD 118 included in the S-NSSAI may be the HPLMN SD. Also, the S-NSSAI may not include the SST 112 of the serving PLMN and the SD 114 of the serving PLMN.

The SMF+PGW-C 304 according to an embodiment of the disclosure may determine whether to consider the S-NSSAI so as to manage and control an amount of data usage of PDN connection, based on at least one of the local configuration of the SMF+PGW-C 304, the operator policy of the SMF+PGW-C 304, information (e.g., UE ID, the DNN information, etc.) received in operation 314, the information (e.g., the policy information related to S-NSSAI, etc.) received in operation 316, or the information (e.g., subscription information related to S-NSSAI, etc.) received in operation 320. For example, the UE subscription information received from the UDM+HSS node 307 in operation 320 may include information indicating whether the S-NSSAI is a reference target with respect to control and management of the amount of data usage of PDN connection.

According to an embodiment of the disclosure, the SMF+PGW-C 304 may determine to control and manage the amount of data usage of PDN connection, based on the S-NSSAI. For example, the SMF+PGW-C 304 may determine to control and manage the amount of data usage of PDN connection, with respect to enhanced Mobile Broadband (eMBB) S-NSSAI. Also, the SMF+PGW-C 304 may determine not to control and manage the amount of data usage of PDN connection, with respect to ultra-reliable low latency communication (URLLC) S-NSSAI.

According to another embodiment of the disclosure, the SMF+PGW-C 304 may determine to control and manage the amount of data usage of PDN connection, based on a UE. For example, the SMF+PGW-C 304 may determine to control and manage the amount of data usage of PDN connection, with respect to eMBB S-NSSAI requested by a first UE. Also, the SMF+PGW-C 304 may determine not to control and manage the amount of data usage of PDN connection, with respect to the eMBB S-NSSAI requested by a second UE.

According to an embodiment of the disclosure, the SMF+PGW-C 304 may determine to control and manage the amount of data usage of PDN connection, in consideration of S-NSSAI that is a target of session requests received in operations 310 to 314, and then may configure and transmit information about the S-NSSAI to the UPF+PGW-U 305 in operation 322.

In operation 322, the SMF+PGW-C 304 may configure and transmit PDN connection-related information to the UPF+PGW-U 305. The PDN connection-related information may include the S-NSSAI. The UPF+PGW-U 305 may store the received S-NSSAI. The UPF+PGW-U 305 may use the S-NSSAI information so as to control and manage the amount of data usage of PDN connection. The SMF+PGW-C 304 may transmit (provide) PDN connection related information to the UPF+PGW-U 305 via N4 (PFCP) session establishment request message.

In operation 324, the SMF+PGW-C 304 may transmit a Create Session Response message to the S-GW 303. The Create Session Response message may include the S-NSSAI in a Protocol Configuration Option (PCO) form.

In operation 326, the S-GW 303 may transmit a Create Session Response message to the MME 302. The Create Session Response message may include the S-NSSAI in a PCO form.

In operation 328, the MME 302 may transmit a message to the E-UTRAN 301. The message may include the S-NSSAI in a PCO form.

In operation 330, the E-UTRAN 301 may transmit a message to the UE 300. The message may include the S-NSSAI in a PCO form.

In operation 330, the UE 300 may receive the message and may store the S-NSSAI associated with PDN connection. The UE 300 may transmit or receive data by using the established PDN connection.

Figure 4:
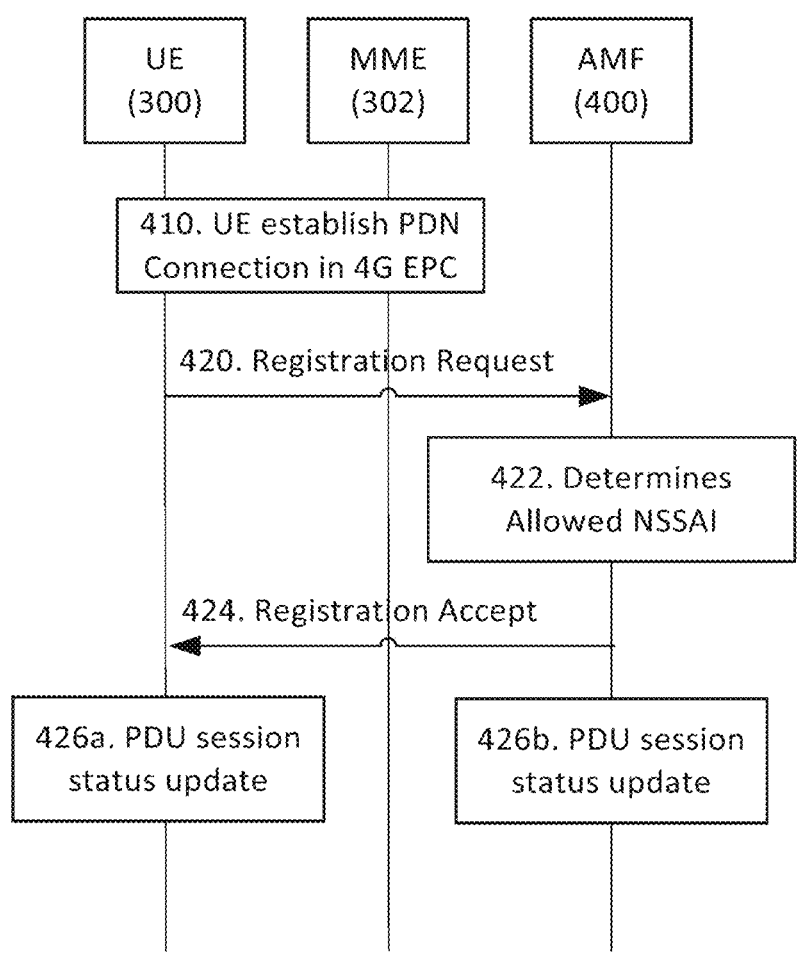
FIG. 4 illustrates an idle mode mobility procedure of switching from an Evolved Packet Core (EPC) to a 5G core network (5GC), according to an embodiment of the disclosure.

FIG. 4 illustrates an idle mode mobility procedure of switching from the EPC to the 5GC, according to an embodiment of the disclosure.

Referring to FIG. 4, the UE 300 may establish PDN connection in the EPS and may use a service. In a PDN connection establishment procedure, the UE 300 may receive PCO-form S-NSSAI associated with the PDN connection from the SMF+PGW-C 304 of the EPS, and may store the received S-NSSAI. After switching to the 5GS, the UE 300 may successively use, as a Packet Data Unit (PDU) session in the 5GS, PDN connection generated in the EPS, by using the PCO-form S-NSSAI received from the SMF+PGW-C 304 of the EPS. In the present embodiment of the disclosure, the EPS may be referred to as the source PLMN, and the 5GS may be referred to as the target PLMN.

In operation 410, the UE 300 may establish PDN connection in the EPS and may transmit or receive data. A procedure of establishing the PDN connection in the EPS may be referred to the method of FIG. 3. In particular, operation 330 in which the UE 300 receives the PCO-form S-NSSAI from the SMF+PGW-C 304 of the EPS and stores the received S-NSSAI may be referred to in the PDN connection establishment procedure shown in FIG. 3.

In operation 430, after the UE 300 switches to the 5GS, the UE 300 may transmit a Registration Request message to an AMF 400 of the 5GS. The Registration Request message may include Requested NSSAI. The Requested NSSAI may include first S-NSSAI that is associated with PDN connection and is received by the UE 300 in operation 410 or operation 330 of FIG. 3.

In operation 422, the AMF 400 may determine Allowed NSSAI based on at least one of the Requested NSSAI received from the UE 300, UE subscription information received from UDM, local configuration of the AMF 400, or an operator policy of the AMF 400.

In operation 424, the AMF 400 may transmit a Registration Accept message to the UE 300. The Registration Accept message may include the Allowed NSSAI. The Allowed NSSAI may include second S-NSSAI.

In operation 426a, the UE 300 may receive the Registration Accept message from the AMF 400 and then may update the S-NSSAI associated with the PDN connection, the S-NSSAI being received in operation 410 or FIG. 3. For example, the UE 300 may compare the first S-NSSAI that is associated with PDN connection and is included in the Requested NSSAI in operation 420 with the second S-NSSAI included in the Allowed NSSAI received in operation 424. The UE 300 may compare the HPLMN SST 116 and/or the HPLMN SD 118 of the first S-NSSAI with the HPLMN SST 116 and/or the HPLMN SD 118 of the second S-NSSAI. In a case where the HPLMN SST 116 and/or the HPLMN SD 118 of the first S-NSSAI are equal to the HPLMN SST 116 and/or the HPLMN SD 118 of the second S-NSSAI, the UE 300 may update (replace) values of the SST 112 of the serving PLMN and/or the SD 114 of the serving PLMN of the S-NSSAI associated with the PDN connection from the SST 112 of the serving PLMN and/or the SD 114 of the serving PLMN of the first S-NSSAI to the SST 112 of the serving PLMN and/or the SD 114 of the serving PLMN of the second S-NSSAI.

The UE 300 may update, by using the aforementioned method, the SST 112 of the serving PLMN and/or the SD 114 of the serving PLMN of the S-NSSAI associated with the PDN connection established in the source PLMN in operation 410 or FIG. 3 to the SST 112 of the serving PLMN and/or the SD 114 of the serving PLMN which are usable in the target PLMN, and then may successively use the PDN connection generated in the EPS as a PDU session in the 5GS.

In operation 426b, the AMF 400 that determined the Allowed NSSAI in operation 422 may update information about the S-NSSAI associated with the PDN connection established in the EPS in FIG. 3 or operation 410. For example, the AMF 400 may compare the first S-NSSAI associated with PDN connection received from an EPC NF (e.g., the MME 302, etc.) or a 5GC NF (e.g., UDM, etc.) with the second S-NSSAI included in the Allowed NSSAI determined in operation 422. The AMF 400 may compare the HPLMN SST 116 and/or the HPLMN SD 118 of the first S-NSSAI with the HPLMN SST 116 and/or the HPLMN SD 118 of the second S-NSSAI. In a case where the HPLMN SST 116 and/or the HPLMN SD 118 of the first S-NSSAI are equal to the HPLMN SST 116 and/or the HPLMN SD 118 of the second S-NSSAI, the AMF 400 update (replace) values of the SST 112 of the serving PLMN and/or the SD 114 of the serving PLMN of the S-NSSAI associated with the PDN connection from the SST 112 of the serving PLMN and/or the SD 114 of the serving PLMN of the first S-NSSAI to the SST 112 of the serving PLMN and/or the SD 114 of the serving PLMN of the second S-NSSAI.

The AMF 400 may update, by using the aforementioned method, the SST 112 of the serving PLMN and/or the SD 114 of the serving PLMN of the S-NSSAI associated with the PDN connection established in the source PLMN in operation 410 or FIG. 3 to the SST 112 of the serving PLMN and/or the SD 114 of the serving PLMN which are usable in the target PLMN, and thus may successively provide the PDN connection generated in the EPS, as the PDU session in the 5GS.

Figure 8:
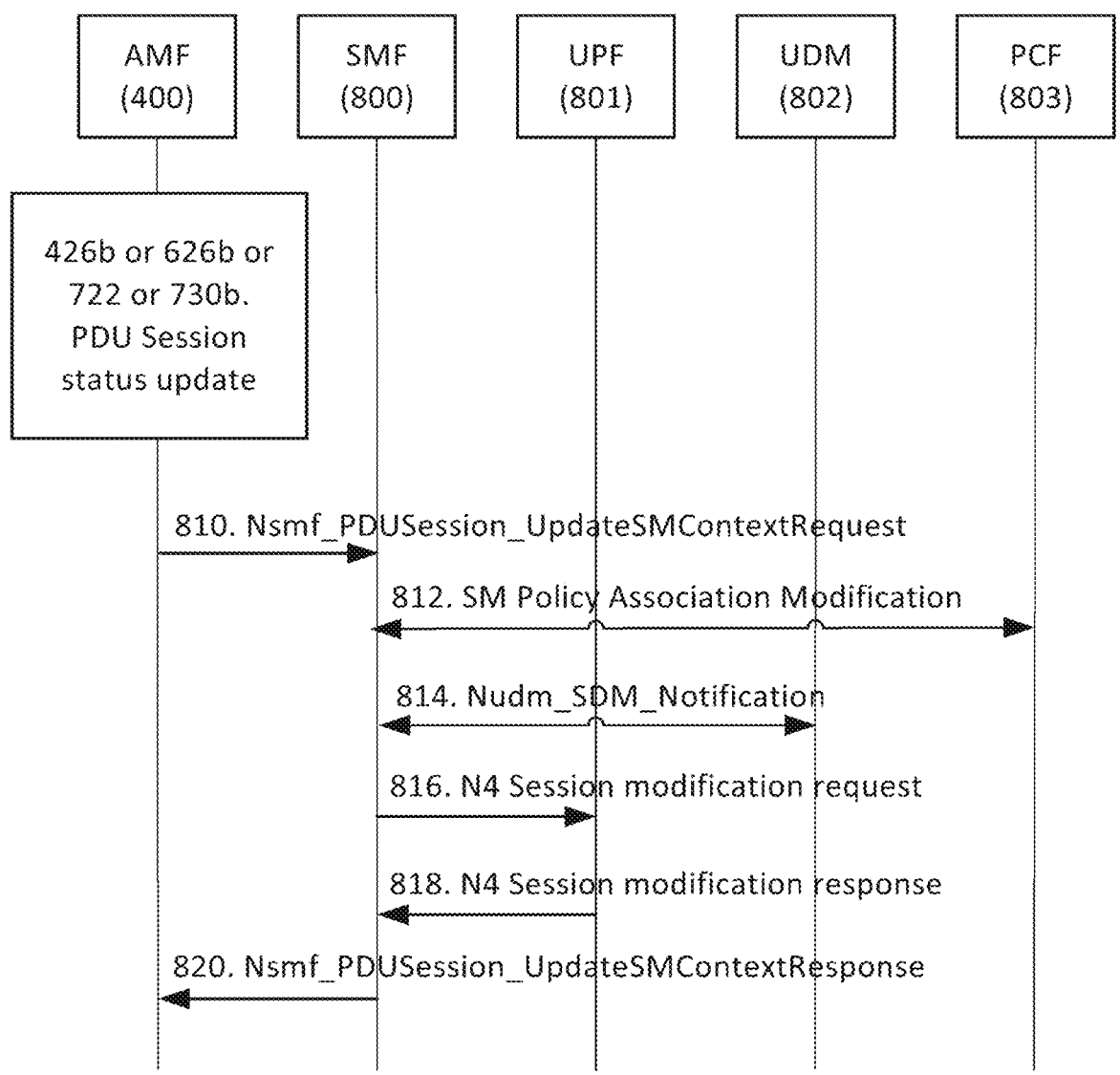
FIG. 8 illustrates an N4 session update procedure, according to an embodiment of the disclosure.

According to an embodiment of the disclosure, after the AMF 400 updates the S-NSSAI associated with the PDN connection, the AMF 400 may start an N4 session update procedure shown in FIG. 8.

Figure 5:
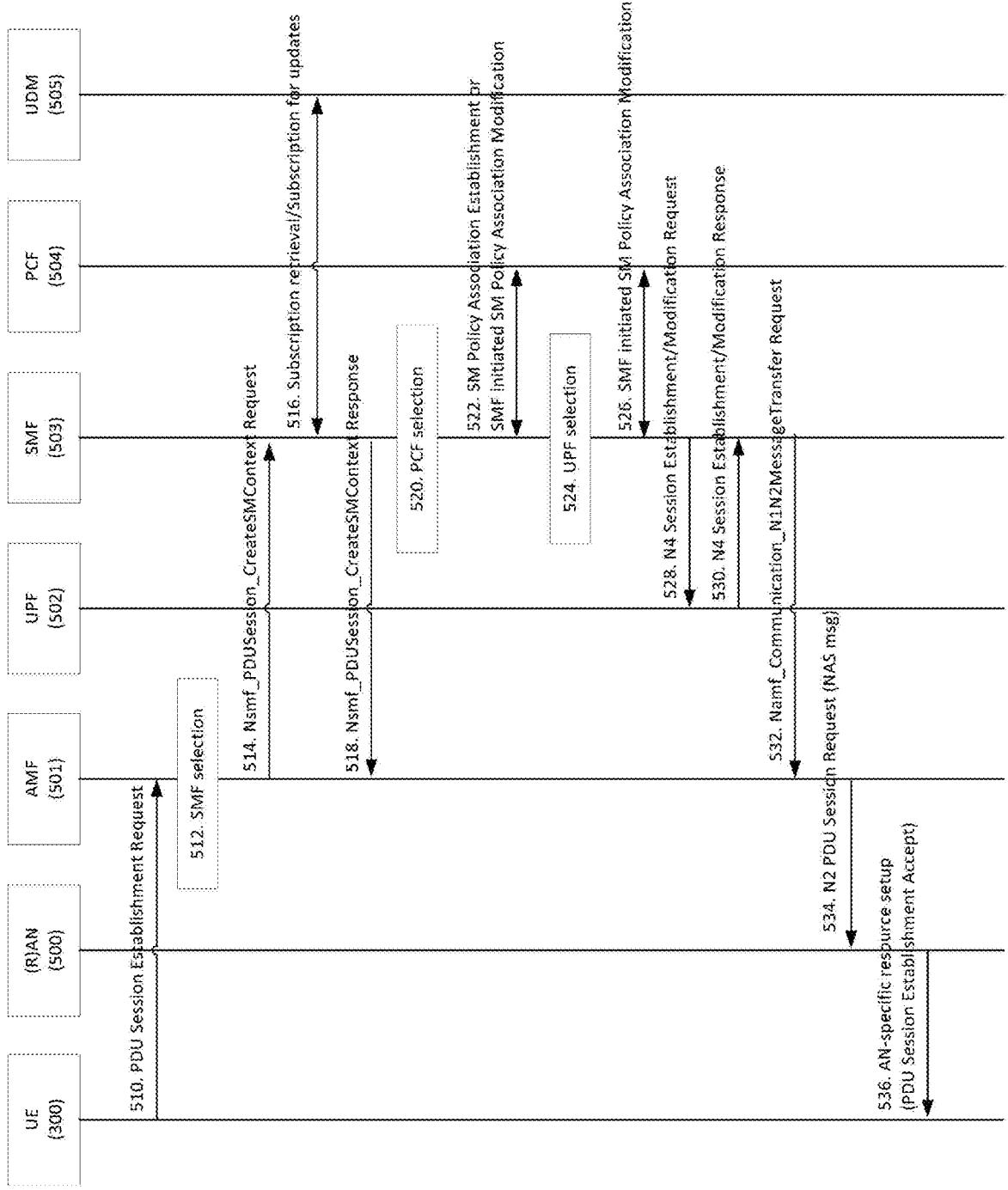
FIG. 5 illustrates a Packet Data Unit (PDU) session generation procedure, according to an embodiment of the disclosure.

FIG. 5 illustrates a PDU session generation procedure, according to an embodiment of the disclosure.

Referring to FIG. 5, the UE 300 may establish a PDU session by accessing an AMF 501 of the 5GS via a 5G BS ((R)AN) 500, and may use a 5GS network service.

In operation 510, the UE 300 may transmit a PDU Session Establishment Request message to the AMF 501 via the 5G BS ((R)AN) 500. The PDU Session Establishment Request message may include information about S-NSSAI associated with a PDU session.

In operation 512, the AMF 501 may select an SMF.

In operation 514, the AMF 501 may transmit a session generation request message to a SMF 503. The session generation request message may include information about S-NSSAI associated with a PDU session. The session generation request message may be a Nsmf_PDUSession_CreateSMContext Request message.

In operation 516, the SMF 503 may receive UE subscription information from a UDM 505.

In operation 518, the SMF 503 may transmit a session generation response message to the AMF 501.

In operation 520, the SMF 503 may select a PCF 504.

In operation 522, the SMF 503 and the PCF 504 may perform a SM Policy Association Establishment or SM Policy Association Modification procedure.

In operation 524, the SMF 503 may select a UPF 502. For example, the SMF 503 may select a UPF that supports S-NSSAI associated with a PDU session.

In operation 526, the SMF 503 and the PCF 504 may perform a SM Policy Association Modification procedure.

The SMF 503 according to an embodiment of the disclosure may determine whether to consider the S-NSSAI so as to manage and control an amount of data usage of PDU session, based on at least one of local configuration of the SMF 503, an operator policy of the SMF 503, information (e.g., UE ID, S-NSSAI, DNN information, etc.) received in operation 514, information (e.g., subscription information related to S-NSSAI, etc.) received in operation 516, or information (e.g., policy information related to S-NSSAI, etc.) received in operation 522 or 526. For example, the UE subscription information received from the UDM 505 in operation 516 may include information indicating whether the S-NSSAI is a reference target with respect to control and management of the amount of data usage of PDU session.

According to an embodiment of the disclosure, the SMF 503 may determine to control and manage the amount of data usage of PDU session, based on the S-NSSAI. For example, the SMF 503 may determine to control and manage the amount of data usage of PDU session, with respect to eMBB S-NSSAI. Also, the SMF 503 may determine not to control and manage the amount of data usage of PDU session, with respect to URLLC S-NSSAI.

According to another embodiment of the disclosure, the SMF 503 may determine to control and manage the amount of data usage of PDU session, based on a UE. For example, the SMF 503 may determine to control and manage the amount of data usage of PDU session, with respect to eMBB S-NSSAI requested by a first UE. Also, the SMF 503 may determine not to control and manage the amount of data usage of PDU session, with respect to the eMBB S-NSSAI requested by a second UE.

According to an embodiment of the disclosure, the SMF 503 that determined to control and manage the amount of data usage of PDU session, in consideration of S-NSSAI that is a target of session requests received in operations 510 to 514 may configure and transmit information about the S-NSSAI to the UPF 502 in operation 528.

In operation 528, the SMF 503 may transmit an N4 Session Establishment Request or N4 Session Modification Request message to the UPF 502. In an embodiment of the disclosure, the N4 Session Establishment Request or N4 Session Modification Request message may include S-NSSAI associated with a PDU session.

In a case where the PDU session generation procedure of FIG. 5 occurs in a non-roaming situation, the S-NSSAI associated with a PDU session may include at least one of the SST 112 of the serving PLMN, the SD 114 of the serving PLMN, the HPLMN SST 116, or the HPLMN SD 118. In an embodiment of the disclosure, the SST 112 of the serving PLMN which is included in the S-NSSAI may be the HPLMN SST. Also, the SD 114 of the serving PLMN which is included in the S-NSSAI may be the HPLMN SD.

In a case where the PDU session generation procedure of FIG. 5 occurs in a local breakout roaming situation or a home route roaming situation, the S-NSSAI associated with a PDU session may include at least one of the SST 112 of the serving PLMN, the SD 114 of the serving PLMN, the HPLMN SST 116, or the HPLMN SD 118. In an embodiment of the disclosure, the SST 112 of the serving PLMN which is included in the S-NSSAI may be the VPLMN SST. The SD 114 of the serving PLMN which is included in the S-NSSAI may be the VPLMN SD.

In a case where the PDU session generation procedure of FIG. 5 occurs in a home routed roaming situation, the S-NSSAI transmitted from the SMF 503 to the UPF 502 may include at least one of the SST 112 of the serving PLMN, the SD 114 of the serving PLMN, the HPLMN SST 116, or the HPLMN SD 118. In an embodiment of the disclosure, the SST 112 of the serving PLMN which is included in the S-NSSAI may be the VPLMN SST. The SD 114 of the serving PLMN which is included in the S-NSSAI may be the VPLMN SD. The HPLMN SST 116 which is included in the S-NSSAI may be the HPLMN SST. The HPLMN SD 118 which is included in the S-NSSAI may be the HPLMN SD.

In a case of a home routed roaming situation, S-NSSAI transmitted from V-SMF in a VPLMN to V-UPF may include at least one of the SST 112 of the serving PLMN or the SD 114 of the serving PLMN. In an embodiment of the disclosure, the S-NSSAI transmitted from the V-SMF in the VPLMN to the V-UPF may not include the SST 112 of the serving PLMN and the SD 114 of the serving PLMN.

The V-SMF in the VPLMN may transmit S-NSSAI to H-SMF in a HPLMN. In an embodiment of the disclosure, the S-NSSAI transmitted from the V-SMF to the H-SMF may include at least one of the SST 112 of the serving PLMN, the SD 114 of the serving PLMN, the HPLMN SST 116, or the HPLMN SD 118.

The H-SMF in the HPLMN may process the S-NSSAI received from the V-SMF. For example, the H-SMF may transmit, to H-UPF, the HPLMN SST 116 and the HPLMN SD 118 in the S-NSSAI received from the V-SMF. Also, the H-SMF may not transmit, to the H-UPF, the SST 112 of the serving PLMN and the SD 114 of the serving PLMN in the S-NSSAI received from the V-SMF. That is, the S-NSSAI transmitted from the H-SMF to the H-UPF may include at least one of the HPLMN SST 116 or the HPLMN SD 118. The S-NSSAI transmitted from the H-SMF in the HPLMN to the H-UPF may not include the SST 112 of the serving PLMN and the SD 114 of the serving PLMN.

According to another embodiment of the disclosure, the V-SMF in the VPLMN may transmit S-NSSAI to the H-SMF in the HPLMN. For example, the S-NSSAI transmitted from the V-SMF to the H-SMF may include at least one of the HPLMN SST 116 or the HPLMN SD 118, and may not include the SST 112 of the serving PLMN and the SD 114 of the serving PLMN.

The H-SMF in the HPLMN may process the S-NSSAI received from the V-SMF. For example, the H-SMF may transmit the S-NSSAI received from the V-SMF to the H-UPF in the HPLMN. The S-NSSAI transmitted from the H-SMF to the H-UPF may include at least one of the HPLMN SST 116 or the HPLMN SD 118, and may not include the SST 112 of the serving PLMN and the SD 114 of the serving PLMN.

The UPF 502 may store the received S-NSSAI. The UPF 502 may use the S-NSSAI so as to manage and control the amount of data usage of PDU session.

In operation 530, the UPF 502 may transmit an N4 Session Establishment Response or N4 Session Modification Response message to the SMF 503.

In operation 532, the SMF 503 may transmit a N1N2 message transfer request message to the AMF 501. The N1N2 message transfer request message may include a PDU Session Establishment Accept message.

In operation 534, the AMF 501 may transmit an N2 PDU Session Request message to the 5G BS ((R)AN) 500. The N2 PDU Session Request message may include a PDU Session Establishment Accept message.

In operation 536, the 5G BS ((R)AN) 500 and the UE 300 may perform an AN-specific resource setup procedure. In the AN-specific resource setup procedure, the 5G BS ((R)AN) 500 may transmit a PDU Session Establishment Accept message to the UE 300.

After the UE 300 receives the message of operation 536, the UE 300 may store the S-NSSAI associated with a PDU session. The UE 300 may transmit or receive data by using the established PDU session.

Figure 6:
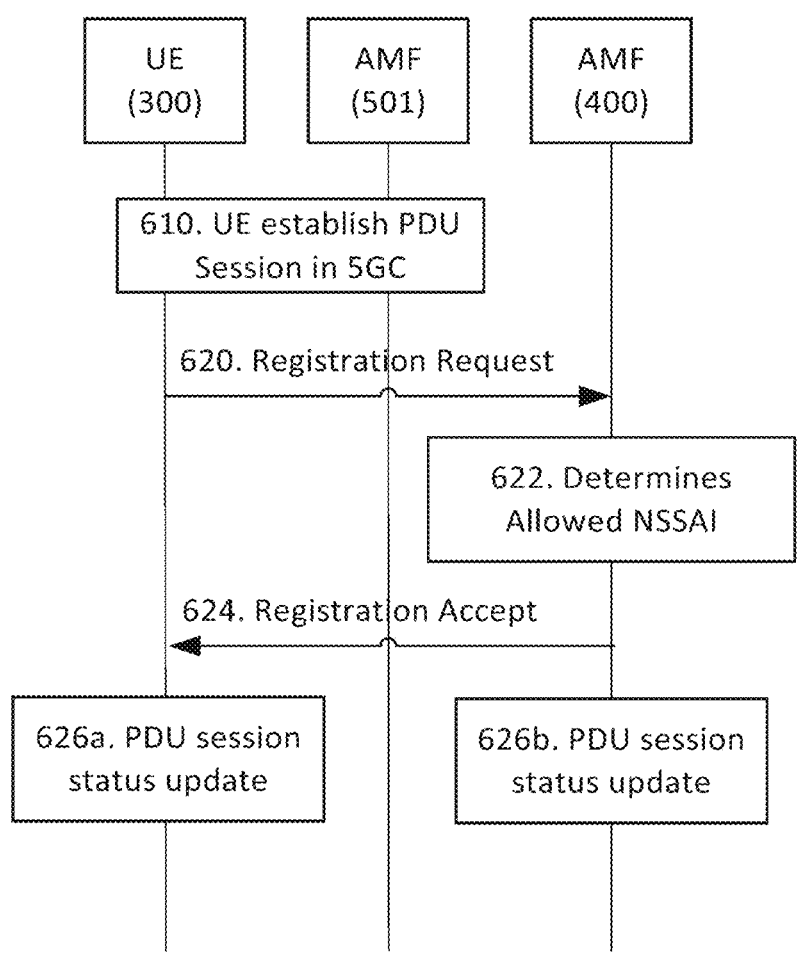
FIG. 6 illustrates an idle mode mobility procedure of switching from the 5GC to another 5GC, according to an embodiment of the disclosure.

FIG. 6 illustrates an idle mode mobility procedure of switching from the 5GC to another 5GC, according to an embodiment of the disclosure.

Referring to FIG. 6, the UE 300 may establish a PDU session in a first 5GS and may use a service. In a PDU session establishment procedure, the UE 300 may store S-NSSAI associated with the PDU session established in the first 5GS. After the UE 300 switches to a second 5GS, the UE 300 may successively use, in the second 5GS, the PDU session established in the first 5GS. In the present embodiment of the disclosure, the first 5GS may be referred to as the source PLMN, and the second 5GS may be referred to as the target PLMN.

According to an embodiment of the disclosure, the AMF 501 of the first 5GS and the AMF 400 of the second 5GS may be equal to or different from each other.

In operation 610, the UE 300 may establish the PDU session in the first 5GS and may transmit or receive data. A procedure of establishing the PDU session in the first 5GS is equal to the method shown with reference to FIG. 4. In the PDU session establishment procedure shown in FIG. 4, the UE 300 may store the S-NSSAI associated with the PDU session.

In operation 620, after the UE 300 switches to the second 5GS, the UE 300 may transmit a Registration Request message to the AMF 400 of the second 5GS. The Registration Request message may include Requested NSSAI. The Requested NSSAI may include first S-NSSAI that is associated with the PDU session established in the first 5GS in FIG. 5 or operation 610.

In operation 622, the AMF 400 may determine Allowed NSSAI, based on at least one of the Requested NSSAI received from the UE 300, the UE subscription information received from the UDM, the local configuration of the AMF 400, or the operator policy of the AMF 400.

In operation 624, the AMF 400 may transmit a Registration Accept message to the UE 300. The Registration Accept message may include the Allowed NSSAI. The Allowed NSSAI may include second S-NSSAI.

In operation 626a, the UE 300 may receive the Registration Accept message from the AMF 400 and then may update the S-NSSAI that is associated with the PDU session and is stored in operation 610 or FIG. 5. For example, the UE 300 may compare the first S-NSSAI that is associated with the PDU session and is included in the Requested NSSAI in operation 620 with the second S-NSSAI included in the Allowed NSSAI received in operation 624. The UE 300 may compare the HPLMN SST 116 and/or the HPLMN SD 118 of the first S-NSSAI with the HPLMN SST 116 and/or the HPLMN SD 118 of the second S-NSSAI. In a case where the HPLMN SST 116 and/or the HPLMN SD 118 of the first S-NSSAI are equal to the HPLMN SST 116 and/or the HPLMN SD 118 of the second S-NSSAI, the UE 300 may update (replace) values of the SST 112 of the serving PLMN and/or the SD 114 of the serving PLMN of the S-NSSAI associated with the PDU session from the SST 112 of the serving PLMN and/or the SD 114 of the serving PLMN of the first S-NSSAI to the SST 112 of the serving PLMN and/or the SD 114 of the serving PLMN of the second S-NSSAI.

The UE 300 may update, by using the aforementioned method, the SST 112 of the serving PLMN and/or the SD 114 of the serving PLMN of the S-NSSAI associated with the PDU session established in the source PLMN in operation 610 or FIG. 5 to the SST 112 of the serving PLMN and/or the SD 114 of the serving PLMN which are usable in the target PLMN, and then may successively use, in the second 5GS, the PDU session generated in the first 5GS.

Operation 626b: The AMF 400 that determined the Allowed NSSAI in operation 622 may update information about the S-NSSAI associated with the PDU session established in the first 5GS in operation 610 or FIG. 5. For example, the AMF 400 may compare the first S-NSSAI that is associated with the PDU session and is received from a 5GC NF (e.g., AMF, UDM, etc.) with the second S-NSSAI included in the Allowed NSSAI determined in operation 622. The AMF 400 may compare the HPLMN SST 116 and/or the HPLMN SD 118 of the first S-NSSAI with the HPLMN SST 116 and/or the HPLMN SD 118 of the second S-NSSAI. In a case where the HPLMN SST 116 and/or the HPLMN SD 118 of the first S-NSSAI are equal to the HPLMN SST 116 and/or the HPLMN SD 118 of the second S-NSSAI, the AMF 400 update (replace) values of the SST 112 of the serving PLMN and/or the SD 114 of the serving PLMN of the S-NSSAI associated with the PDU session from the SST 112 of the serving PLMN and/or the SD 114 of the serving PLMN of the first S-NSSAI to the SST 112 of the serving PLMN and/or the SD 114 of the serving PLMN of the second S-NSSAI.

The AMF 400 may update, by using the aforementioned method, the SST 112 of the serving PLMN and/or the SD 114 of the serving PLMN of the S-NSSAI associated with the PDU session established in the source PLMN in operation 610 or FIG. 5 to the SST 112 of the serving PLMN and/or the SD 114 of the serving PLMN which are usable in the target PLMN, and thus may successively provide the PDU session, which is generated in the first 5GS, to the second 5GS.

According to an embodiment of the disclosure, after the AMF 400 updates the S-NSSAI associated with the PDU session, the AMF 400 may start an N4 session update procedure shown in FIG. 8.

Figure 7:
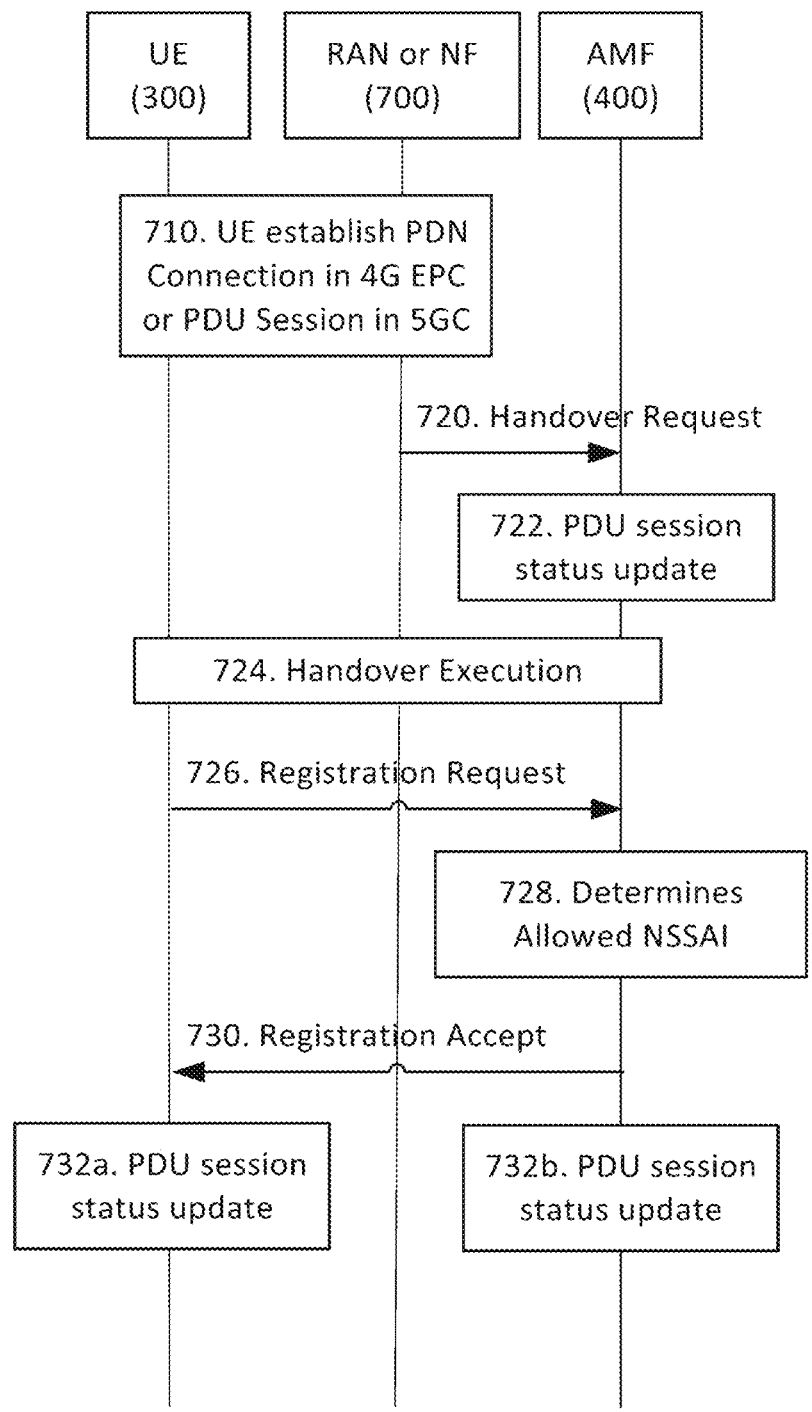
FIG. 7 illustrates a connected mode mobility procedure of switching from the EPC or the 5GC to another 5GC, according to an embodiment of the disclosure.

FIG. 7 illustrates a connected mode mobility procedure of switching from the EPC or the 5GC to another 5GC, according to an embodiment of the disclosure.

Referring to FIG. 7, the UE 300 may establish PDN connection in the EPC and may use a service. Alternatively, the UE 300 may establish a PDU session in the first 5GS and may use a service. In the PDN connection establishment procedure or the PDU session establishment procedure, the UE 300 may store S-NSSAI associated with the PDN connection or the PDU session established in the EPC or the first 5GS. After the UE 300 switches to the second 5GS, the UE 300 may successively use, in the second 5GS, the PDN connection established in the EPC or the PDU session generated in the first 5GS. In the present embodiment of the disclosure, the EPC or the first 5GS may be referred to as the source PLMN, and the second 5GS may be referred to as the target PLMN.

According to an embodiment of the disclosure, the AMF 501 of the first 5GS and the AMF 400 of the second 5GS may be equal to or different from each other.

In operation 710, the UE 300 may establish the PDN connection in the EPS and may transmit or receive data. The procedure of establishing the PDN connection in the EPS may be referred to the method of FIG. 3. In the PDN connection establishment procedure shown in FIG. 3, in operation 330, the UE 300 may receive the PCO-form S-NSSAI from the SMF+PGW-C 304 of the EPS and may store the received S-NSSAI.

According to another embodiment of the disclosure, the UE 300 may establish the PDU session in the first 5GS and may transmit or receive data. A procedure of establishing the PDU session in the first 5GS is equal to the method shown with reference to FIG. 4. In the PDU session establishment procedure shown in FIG. 4, the UE 300 may store the S-NSSAI associated with the PDU session.

In operation 720, the UE 300 in a connected mode may switch to the second 5GS. The AMF 400 of the second 5GS may receive a Handover Request message from a 5G BS (RAN) 700 or an NF 700 which is connected to the AMF 400 of the second 5GS. The NF 700 may correspond to the MME 302 of the EPC or the AMF 501 of the first 5GS. The Handover Request message may include information about the PDN connection the UE 300 establishes in the EPC or information about the PDU session the UE 300 establishes in the first 5GS. The information about the PDN connection established in the EPC may include the first S-NSSAI associated with the PDN connection. The information about the PDU session established in the first 5GS may include the first S-NSSAI associated with the PDU session.

In operation 722, the AMF 400 may determine second S-NSSAI being usable in the second 5GS that is the target PLMN. Also, the AMF 400 may update information about the S-NSSAI that is associated with the PDN connection the UE 300 establishes in the EPC in FIG. 3 or operation 410 or information about the S-NSSAI that is associated with the PDU session the UE 300 establishes in the first 5GS in FIG. 5 or operation 610. For example, the AMF 400 may compare the first S-NSSAI with the second S-NSSAI determined in operation 722, the first S-NSSAI being associated with the PDN connection or the PDU session and being received from the 5G BS (RAN) or NF 700 (e.g., MME, AMF, UDM, etc.). The AMF 400 may compare the HPLMN SST 116 and/or the HPLMN SD 118 of the first S-NSSAI with the HPLMN SST 116 and/or the HPLMN SD 118 of the second S-NSSAI. In a case where the HPLMN SST 116 and/or the HPLMN SD 118 of the first S-NSSAI are equal to the HPLMN SST 116 and/or the HPLMN SD 118 of the second S-NSSAI, the AMF 400 may update (replace) values of the SST 112 of the serving PLMN and/or the SD 114 of the serving PLMN of the S-NSSAI associated with the PDN connection or the PDU session from the SST 112 of the serving PLMN and/or the SD 114 of the serving PLMN of the first S-NSSAI to the SST 112 of the serving PLMN and/or the SD 114 of the serving PLMN of the second S-NSSAI.

The AMF 400 may update, by using the aforementioned method, the SST 112 of the serving PLMN and/or the SD 114 of the serving PLMN of the S-NSSAI associated with the PDN connection or the PDU session established in the source PLMN in FIG. 3 or operation 410 or in operation 610 or FIG. 5 to the SST 112 of the serving PLMN and/or the SD 114 of the serving PLMN which are usable in the target PLMN, and thus may successively provide the PDN connection generated in the EPC or the PDU session generated in the first 5GS to the second 5GS.

According to an embodiment of the disclosure, after the AMF 400 updates the S-NSSAI associated with the PDU session, the AMF 400 may start an N4 session update procedure shown in FIG. 8.

In operation 724, the AMF 400 may execute a Handover Execution procedure.

In operation 726, after the Handover Execution procedure is performed, the UE 300 may transmit a Registration Request message to the AMF 400 of the second 5GS. The Registration Request message may include Requested NSSAI. The Requested NSSAI may include the first S-NSSAI associated with the PDN connection the UE 300 establishes in the EPC in FIG. 3 or operation 410 or the first S-NSSAI associated with the PDU session the UE 300 establishes in FIG. 5 or operation 610.

In operation 728, the AMF 400 may determine Allowed NSSAI, based on at least one of the Requested NSSAI received from the UE 300, the UE subscription information received from the UDM, the local configuration of the AMF 400, or the operator policy of the AMF 400.

In operation 730, the AMF 400 may transmit a Registration Accept message to the UE 300. The Registration Accept message may include the Allowed NSSAI. The Allowed NSSAI may include the second S-NSSAI.

In operation 732a, the UE 300 may receive the Registration Accept message from the AMF 400 and then may update information about the first S-NSSAI associated with the PDN connection established in the EPC in FIG. 3 or operation 410 or the S-NSSAI that is associated with the PDU session and is stored in operation 610 or FIG. 5. For example, the UE 300 may compare the first S-NSSAI that is associated with the PDN connection or the PDU session and is included in the Requested NSSAI in operation 726 with the second S-NSSAI included in the Allowed NSSAI received in operation 730. The UE 300 may compare the HPLMN SST 116 and/or the HPLMN SD 118 of the first S-NSSAI with the HPLMN SST 116 and/or the HPLMN SD 118 of the second S-NSSAI. In a case where the HPLMN SST 116 and/or the HPLMN SD 118 of the first S-NSSAI are equal to the HPLMN SST 116 and/or the HPLMN SD 118 of the second S-NSSAI, the UE 300 may update (replace) values of the SST 112 of the serving PLMN and/or the SD 114 of the serving PLMN of the S-NSSAI associated with the PDN connection or the PDU session from the SST 112 of the serving PLMN and/or the SD 114 of the serving PLMN of the first S-NSSAI to the SST 112 of the serving PLMN and/or the SD 114 of the serving PLMN of the second S-NSSAI.

The UE 300 may update, by using the aforementioned method, the SST 112 of the serving PLMN and/or the SD 114 of the serving PLMN of the S-NSSAI associated with the PDN connection or the PDU session established in the source PLMN in FIG. 3 or operation 410 or in FIG. 5 or operation 610 to the SST 112 of the serving PLMN and/or the SD 114 of the serving PLMN which are usable in the target PLMN, and then may successively use, in the second 5GS, the PDN connection generated in the EPC or the PDU session generated in the first 5GS.

In operation 732b, the AMF 400 that determined the Allowed NSSAI in operation 728 may update information about the S-NSSAI associated with the PDN connection established in the EPC in FIG. 3 or operation 410 or the PDU session established in the first 5GS in FIG. 5 or operation 610. For example, the AMF 400 may compare the first S-NSSAI that is associated with the PDN connection or the PDU session and is received from a NF (e.g., MME, AMF, UDM, etc.) with the second S-NSSAI included in the Allowed NSSAI determined in operation 728. The AMF 400 may compare the HPLMN SST 116 and/or the HPLMN SD 118 of the first S-NSSAI with the HPLMN SST 116 and/or the HPLMN SD 118 of the second S-NSSAI. In a case where the HPLMN SST 116 and/or the HPLMN SD 118 of the first S-NSSAI are equal to the HPLMN SST 116 and/or the HPLMN SD 118 of the second S-NSSAI, the AMF 400 update (replace) values of the SST 112 of the serving PLMN and/or the SD 114 of the serving PLMN of the S-NSSAI associated with the PDN connection or the PDU session from the SST 112 of the serving PLMN and/or the SD 114 of the serving PLMN of the first S-NSSAI to the SST 112 of the serving PLMN and/or the SD 114 of the serving PLMN of the second S-NSSAI.

The AMF 400 may update, by using the aforementioned method, the SST 112 of the serving PLMN and/or the SD 114 of the serving PLMN of the S-NSSAI associated with the PDN connection or the PDU session established in the source PLMN in FIG. 3 or operation 410 or in FIG. 5 or operation 610 to the SST 112 of the serving PLMN and/or the SD 114 of the serving PLMN which are usable in the target PLMN, and thus may successively provide, to the second 5GS, the PDN connection generated in the EPC or the PDU session generated in the first 5GS.

According to an embodiment of the disclosure, after the AMF 400 updates the S-NSSAI associated with the PDU session, the AMF 400 may start an N4 session update procedure shown in FIG. 8.

FIG. 8 illustrates an N4 session update procedure according to an embodiment of the disclosure.

The AMF 400 according to an embodiment of the disclosure may perform PDU session status update in operation 426b of FIG. 4, operation 626b of FIG. 6, operation 722 of FIG. 7, or operation 730b of FIG. 7. The AMF 400 may perform PDU session status update, thereby changing a value of the S-NSSAI associated with the PDN connection or the PDU session to a value being usable in the target PLMN. That is, the value of the S-NSSAI associated with the PDN connection or the PDU session may be changed from the first S-NSSAI that was used in the source PLMN to the second S-NSSAI that is usable in the target PLMN.

The AMF 400 according to an embodiment of the disclosure may determine whether to consider the S-NSSAI so as to manage and control an amount of data usage of the PDU session, based on at least one of the local configuration of the AMF 400, the operator policy of the AMF 400, information (e.g., UE ID, S-NSSAI, DNN information, or the like which are received in operation 420 of FIG. 4, operation 620 of FIG. 6, operation 720 of FIG. 7, or operation 726 of FIG. 7) received from the UE 300 or the 5G BS (RAN) or NF 700, subscription information (e.g., subscription information related to S-NSSAI, etc.) received from the UDM, or policy information (e.g., policy information related to S-NSSAI, etc.) received from the PCF. For example, the UE subscription information received from the UDM may include information indicating whether the S-NSSAI is a reference target with respect to control and management of the amount of data usage of the PDU session.

According to an embodiment of the disclosure, the AMF 400 may determine to control and manage the amount of data usage of the PDU session, based on the S-NSSAI. For example, the AMF 400 may determine to control and manage the amount of data usage of the PDU session, with respect to eMBB S-NSSAI. Also, the AMF 400 may determine not to control and manage the amount of data usage of the PDU session, with respect to URLLC S-NSSAI.

According to another embodiment of the disclosure, the AMF 400 may determine to control and manage the amount of data usage of the PDU session, based on a UE. For example, the AMF 400 may determine to control and manage the amount of data usage of the PDU session, with respect to eMBB S-NSSAI requested by a first UE. Also, the AMF 400 may determine not to control and manage the amount of data usage of the PDU session, with respect to the eMBB S-NSSAI requested by a second UE.

According to an embodiment of the disclosure, the AMF 400 that determined to control and manage the amount of data usage of the PDU session in consideration of the S-NSSAI may transmit a PDU session update request message to an SMF 800 in operation 810 so as to transmit the (changed) S-NSSAI to a UPF 801.

In operation 810, the AMF 400 may transmit the PDU session update request message to the SMF 800. The PDU session update request message may include the second S-NSSAI that is associated with the PDU session and is usable in the target PLMN. Also, the PDU session update request message may include the first S-NSSAI that was associated with the PDU session and was used in the source PLMN.

In operation 812, the SMF 800 and a PCF 803 may perform a SM Policy Association Modification procedure. In the SM Policy Association Modification procedure, the SMF 800 may transmit, to the PCF 803, the second S-NSSAI that is associated with the PDU session and is usable in the target PLMN.

In operation 814, the SMF 800 may receive updated subscription information from UDM 802.

In operation 816, the SMF 800 may transmit an N4 Session modification request message to the UPF 801. An N4 Session establishment request message or the N4 Session modification request message may include the second S-NSSAI that is usable in the target PLMN. The N4 Session establishment request message or the N4 Session modification request message may include the first S-NSSAI that was used in the source PLMN.

In a case where the N4 session update procedure of FIG. 8 occurs in a non-roaming situation or a Local Breakout roaming situation, the S-NSSAI transmitted from the SMF 800 to the UPF 801 may include at least one of the SST 112 of the serving PLMN or the SD 114 of the serving PLMN. In a case of the non-roaming situation, the SST 112 of the serving PLMN which is included in the S-NSSAI may be the HPLMN SST, and the SD 114 of the serving PLMN which is included in the S-NSSAI may be the HPLMN SD. In a case of the local breakout roaming situation, the SST 112 of the serving PLMN which is included in the S-NSSAI may be the VPLMN SST, and the SD 114 of the serving PLMN which is included in the S-NSSAI may be the VPLMN SD. Also, the S-NSSAI may not include the HPLMN SST 116 and the HPLMN SD 118.

In a case where the N4 session update procedure of FIG. 8 occurs in a Home routed roaming situation, the S-NSSAI transmitted from the SMF 800 to the UPF 801 may include at least one of the SST 112 of the serving PLMN, the SD 114 of the serving PLMN, the HPLMN SST 116, or the HPLMN SD 118. In an embodiment of the disclosure, the SST 112 of the serving PLMN which is included in the S-NSSAI may be the VPLMN SST. The SD 114 of the serving PLMN which is included in the S-NSSAI may be the VPLMN SD. The HPLMN SST 116 included in the S-NSSAI may be the HPLMN SST. The HPLMN SD 118 included in the S-NSSAI may be the HPLMN SD.

In a case of the home routed roaming situation, the S-NSSAI transmitted from the V-SMF in the VPLMN to the V-UPF may include at least one of the SST 112 of the serving PLMN or the SD 114 of the serving PLMN. In an embodiment of the disclosure, the S-NSSAI transmitted from the V-SMF in the VPLMN to the V-UPF may not include the SST 112 of the serving PLMN and the SD 114 of the serving PLMN.

The V-SMF in the VPLMN may transmit the S-NSSAI to the H-SMF in the HPLMN. In an embodiment of the disclosure, the S-NSSAI transmitted from the V-SMF to the H-SMF may include at least one of the SST 112 of the serving PLMN, the SD 114 of the serving PLMN, the HPLMN SST 116, or the HPLMN SD 118.

The H-SMF in the HPLMN may process the S-NSSAI received from the V-SMF. For example, the H-SMF may transmit, to the H-UPF, the HPLMN SST 116 and the HPLMN SD 118 in the S-NSSAI received from the V-SMF. Also, the H-SMF may not transmit, to the H-UPF, the SST 112 of the serving PLMN and the SD 114 of the serving PLMN in the S-NSSAI received from the V-SMF. That is, the S-NSSAI transmitted from the H-SMF to the H-UPF may include at least one of the HPLMN SST 116 or the HPLMN SD 118. According to an embodiment of the disclosure, the S-NSSAI transmitted from the H-SMF in the HPLMN to the H-UPF may not include the SST 112 of the serving PLMN and the SD 114 of the serving PLMN.

According to another embodiment of the disclosure, the V-SMF in the VPLMN may transmit S-NSSAI to the H-SMF in the HPLMN. For example, the S-NSSAI transmitted from the V-SMF to the H-SMF may include at least one of the HPLMN SST 116 or the HPLMN SD 118, and may not include the SST 112 of the serving PLMN and the SD 114 of the serving PLMN.

The H-SMF in the HPLMN may process the S-NSSAI received from the V-SMF. For example, the H-SMF may transmit the S-NSSAI received from the V-SMF to the H-UPF in the HPLMN. The S-NSSAI transmitted from the H-SMF to the H-UPF may include at least one of the HPLMN SST 116 or the HPLMN SD 118, and may not include the SST 112 of the serving PLMN and the SD 114 of the serving PLMN.

In a case where the N4 session update procedure of FIG. 8 occurs in a non-roaming situation or a Local Breakout roaming situation during EPS to 5GS handover, based on the information received from AMF 400 in operation 810, the SMF 800 may determine that the PDN connection is handed over from EPS to 5GS (using N26 interface) during the EPS to 5GS mobility/handover, and the SMF 800 may determine to provide the S-NSSAI to the UPF 801 and initiate N4 (PFCP) Session establishment request or N4 (PFCP) Session modification request message in operation 816 if functionalities in the UPF 801 require the S-NSSAI information, but the S-NSSAI associated with the PDN connection (or PDU session) was not provided from the SMF+PGW-C 304 to UPF+PGW-U 305 in operation 322 at the time of PDN connection establishment or the S-NSSAI associated with the PDN connection (or PDU session) provided from the SMF+PGW-C 304 to UPF+PGW-U 305 in operation 322 at the time of PDN connection establishment needs to be modified (updated). According to embodiment of the disclosure, SMF 800 and SMF+PGW-C 304 can be the same, and UPF 801 and UPF+PGW-U 305 can be the same.

The information received from AMF 400 in operation 810 includes at least one of UE PDN Connection, Target ID, EPS Bearer Status, HO Preparation Indication (HO state), and EPS Interworking Indication. UE PDN Connection contains an MME/SGSN UE EPS PDN connection including the EPS bearer context(s). Target ID contains the Target ID identifying the target RAN Node ID and TAI. EPS Bearer Status is set to the value in Registration Request received from the UE in operation 420. HO Preparation Indication (HO state) is set to request the preparation of a handover of the PDU session. EPS Interworking Indication indicates whether the PDU session may possibly be moved to EPS and whether N26 interface to be used during EPS interworking procedures.

In operation 818, the UPF 801 may store the S-NSSAI received from the SMF 800. The UPF 801 may store the S-NSSAI to be associated with the PDU session, the S-NSSAI being received from the SMF 800. When previous S-NSSAI associated with the PDU session exists, the UPF 801 may update the previous S-NSSAI associated with the PDU session to the received S-NSSAI. The UPF 801 may use information about the S-NSSAI so as to control and manage the amount of data usage of the PDU session.

In operation 820, the SMF 800 may transmit a PDU session update response message to the AMF 400.

The 5G NF (e.g., AMF, SMF, UPF, UDM, PCF, etc.) according to an embodiment of the disclosure may update (change/replace) S-NSSAI associated with a PDU session, according to the N4 session update procedure shown in FIG. 8.

Figure 9:
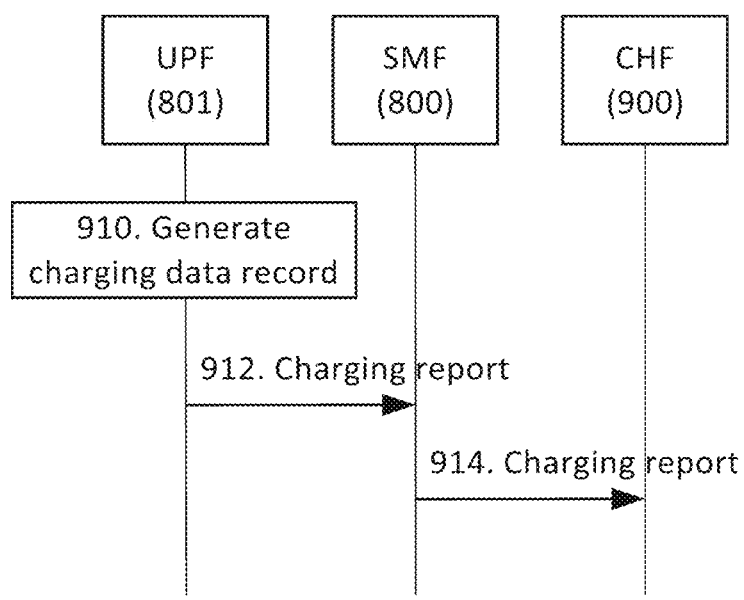
FIGS. 9 and 10 illustrate a procedure of controlling and managing an amount of data usage of the PDU session, according to an embodiment of the disclosure.
Figure 10:
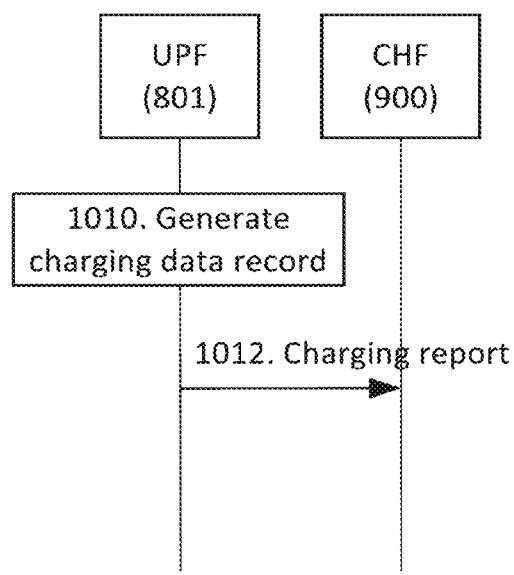

FIGS. 9 and 10 illustrate a procedure of controlling and managing the amount of data usage of the PDU session, according to an embodiment of the disclosure.

The UPF 801 according to an embodiment of the disclosure may generate information about an amount of data usage of the UE 300. The information about the amount of data usage may be referred to as a Charging Data Record (CDR). The CDR may be used as base information to charge for data. When the UPF 801 configures and generates the CDR, the UPF 801 may add S-NSSAI associated with the PDU session to the CDR. When the S-NSSAI associated with the PDU session is updated (replaced) according to an embodiment of the disclosure, the UPF 801 may add the updated S-NSSAI to the CDR.

Referring to FIG. 9, the UPF 801 may transmit the generated CDR to a Charging Function (CHF) 900 via the SMF 800.

In operation 910, the UPF 801 may generate the CDR.

In operation 912, the UPF 801 may transmit the CDR to the SMF 800.

In operation 914, the SMF 800 may transmit the CDR to the CHF 900. The CHF 900 may determine charges for data, based on the CDR.

Referring to FIG. 10, the UPF 801 may transmit a generated CDR to the CHF 900.

In operation 1010, the UPF 801 may generate the CDR.

In operation 1012, the UPF 801 may transmit the CDR to the CHF 900. The CHF 900 may determine charges for data, based on the CDR.

Figure 11:
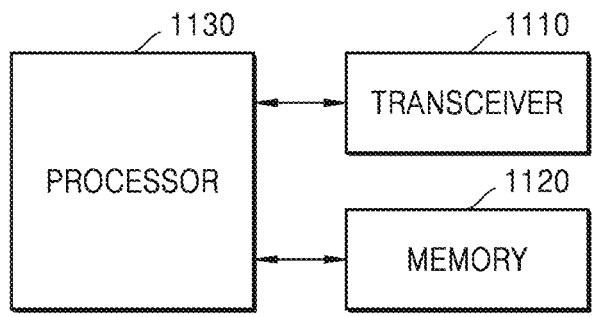
FIG. 11 is a diagram illustrating a configuration of a user equipment (UE), according to an embodiment of the disclosure.

FIG. 11 is a diagram illustrating a configuration of a UE according to an embodiment of the disclosure.

As illustrated in FIG. 11, the UE of the disclosure may include a transceiver 1110, a memory 1120, and a processor 1130. The processor 1130, the transceiver 1110, and the memory 1120 of the UE may operate according to the aforementioned communication method of the UE. However, elements of the UE are not limited thereto. For example, the UE may include more elements than the afore-described elements or may include fewer elements than the afore-described elements. Also, the processor 1130, the transceiver 1110, and the memory 1120 may be implemented as a chip. The processor 1130 may include one or more processors.

A receiver of the UE and a transmitter of the UE may be collectively referred to as the transceiver 1110, and the transceiver 1110 may transmit or receive a signal to or from a BS. The signal transmitted to or received from the BS may include control information and data. To this end, the transceiver 1110 may include a radio frequency (RF) transmitter for up-converting a frequency of and amplifying signals to be transmitted, and an RF receiver for low-noise-amplifying and down-converting a frequency of received signals. However, this is merely an example of the transceiver 1110, and thus elements of the transceiver 1110 are not limited to the RF transmitter and the RF receiver.

Also, the transceiver 1110 may receive signals through radio channels and output the signals to the processor 1130, and may transmit signals output from the processor 1130, through radio channels.

The memory 1120 may store programs and data that are required for operations of the UE. The memory 1120 may also store control information or data included in a signal obtained by the UE. The memory 1120 may be implemented as a storage medium including a read only memory (ROM), a random access memory (RAM), a hard disk, a compact disc (CD)-ROM, a digital versatile disc (DVD), or the like, or any combination thereof.

The processor 1130 may control a series of procedures to operate the UE according to the afore-described embodiments of the disclosure. For example, the processor 1130 may receive a control signal and a data signal via the transceiver 1110, and may process the received control signal and the received data signal. Also, the processor 1130 may transmit the processed control signal and the processed data signal via the transceiver 1110.

Figure 12:
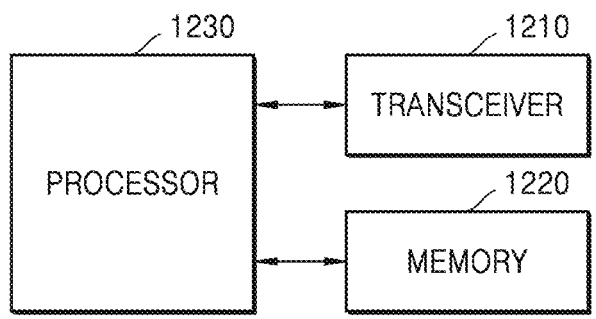
FIG. 12 is a diagram illustrating a configuration of a network entity according to an embodiment of the disclosure.

FIG. 12 is a diagram illustrating a configuration of a network entity according to an embodiment of the disclosure.

As illustrated in FIG. 12, the network entity of the disclosure may include a transceiver 1210, a memory 1220, and a processor 1230. In an embodiment of the disclosure, the network entity may include an NR BS, an AMF, a SMF, a UPF, a PCF, a UDM, an E-UTRA BS, a MME, a SGW, a PGW-U, a PGW-C, a PCRF, a HSS, or the like.

The processor 1230, the transceiver 1210, and the memory 1220 of the network entity may operate according to the aforementioned communication method of the network entity. However, elements of the network entity are not limited thereto. For example, the network entity may include more elements than the afore-described elements or may include fewer elements than the afore-described elements. Also, the processor 1230, the transceiver 1210, and the memory 1220 may be implemented as a chip. The processor 1230 may include one or more processors.

A receiver of the network entity and a transmitter of the network entity may be collectively referred to as the transceiver 1210, and the transceiver 1210 may transmit or receive a signal to or from a BS. The signal transmitted to or received from the BS may include control information and data. To this end, the transceiver 1210 may include a RF transmitter for up-converting a frequency of and amplifying signals to be transmitted, and an RF receiver for low-noise-amplifying and down-converting a frequency of received signals. However, this is merely an example of the transceiver 1210, and thus elements of the transceiver 1210 are not limited to the RF transmitter and the RF receiver.

Also, the transceiver 1210 may receive signals through radio channels and output the signals to the processor 1230, and may transmit signals output from the processor 1230, through radio channels.

The memory 1220 may store programs and data that are required for operations of the network entity. The memory 1220 may also store control information or data included in a signal obtained by the network entity. The memory 1220 may be implemented as a storage medium including a ROM, a RAM, a hard disk, a CD-ROM, a DVD, or the like, or any combination thereof.

The processor 1230 may control a series of procedures to operate the network entity according to the afore-described embodiments of the disclosure. For example, the processor 1230 may receive a control signal and a data signal via the transceiver 1210, and may process the received control signal and the received data signal. Also, the processor 1230 may transmit the processed control signal and the processed data signal via the transceiver 1210.

The methods according to the embodiments of the disclosure as described herein or in the following claims may be implemented as hardware, software, or a combination of hardware and software.

When implemented as software, a computer-readable storage medium or a computer program product which stores one or more programs (e.g., software modules) may be provided. The one or more programs, which are stored in the computer-readable storage medium or the computer program product, are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

According to various embodiments of the disclosure, a mobile communication network system providing a network slice function may control a user plane function, and thus, may efficiently provide a service.

Effects that are obtainable from the disclosure are not limited to the aforementioned effect, and other unstated effects will be clearly understood by one of ordinary skill in the art in view of descriptions below.

In the above particular embodiments of the disclosure, the elements included in the disclosure are expressed in the singular or plural according to the presented particular embodiments of the disclosure. However, the singular or plural expressions are selected suitably according to the presented situations for convenience of descriptions, the disclosure is not limited to the singular or plural elements, and the elements expressed in the plural may even be configured in the singular or the elements expressed in the singular may even be configured in the plural.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, portions of an embodiment of the disclosure are combined with portions of another embodiment of the disclosure. The embodiments of the disclosure may also be applied to other communication systems such as an LTE system, a 5G or NR system, or the like, and various modifications based on the technical concept of the embodiments of the disclosure may be made.

What is claimed is:

1. A method performed, by an access and mobility management function (AMF), in a wireless communication system, the method comprising:
receiving, from a user equipment (UE) with a packet data network (PDN) connection established, a registration request message including a first single-network slice selection assistance information (S-NSSAI) associated with the PDN connection;
determining a second S-NSSAI associated with a packet data unit (PDU) session corresponding to the PDN connection based on the first S-NSSAI; and
transmitting information regarding the second S-NSSAI to a user plane function (UPF) via a session management function (SMF) to request modification of an N4 session.

2. The method of claim 1, further comprising:
transmitting a message for requesting an update of the PDU session to the SMF,
wherein the message for requesting the update of the PDU session includes the information regarding the second S-NSSAI.

3. The method of claim 1,
wherein the second S-NSSAI is used for performance measurement of the PDU session by the UPF.

4. The method of claim 1,
wherein when a third S-NSSAI stored in the UPF and associated with the PDU session is different with the second S-NSSAI, the third S-NSSAI is updated with the second S-NSSAI.

5. The method of claim 1,
wherein the information regarding the second S-NSSAI includes an information on a slice/service type (SST) used in a 5th generation system (5GS) and an information on a slice differentiator (SD) used in the 5GS.

6. An access and mobility management function (AMF) in a wireless communication system, the AMF comprising:
a transceiver; and
at least one processor configured to:
receive, from a user equipment (UE) with a packet data network (PDN) connection established, a registration request message including a first single-network slice selection assistance information (S-NSSAI) associated with the PDN connection,
determine a second S-NSSAI associated with a packet data unit (PDU) session corresponding to the PDN connection based on the first S-NSSAI, and
transmit information regarding the second S-NSSAI to a user plane function (UPF) via a session management function (SMF) to request modification of an N4 session.

7. The AMF of claim 6, wherein:
the at least one processor is further configured to transmit a message for requesting an update of the PDU session to the SMF, and
the message for requesting the update of the PDU session includes the information regarding the second S-NSSAI.

8. The AMF of claim 6,
wherein the second S-NSSAI is used for performance measurement of the PDU session by the UPF.

9. The AMF of claim 6,
wherein when a third S-NSSAI stored in the UPF and associated with the PDU session is different with the second S-NSSAI, the third S-NSSAI is updated with the second S-NSSAI.

10. The AMF of claim 6,
wherein the information regarding the second S-NSSAI includes an information on a slice/service type (SST) used in a 5th generation system (5GS) and an information on a slice differentiator (SD) used in the 5GS.

11. A wireless communication system to modify an N4 session, the system comprising:
a user equipment (UE) with a packet data network (PDN) connection established;
a session management function (SMF);
a user plane function (UPF); and
an access and mobility management function (AMF) configured to:
receive, from the UE, a registration request message including a first single-network slice selection assistance information (S-NSSAI) associated with the PDN connection,
determine a second S-NSSAI associated with a packet data unit (PDU) session corresponding to the PDN connection based on the first S-NSSAI, and transmit information regarding the second S-NSSAI to the UPF via the SMF to request modification of the N4 session.

12. The system of claim 11, wherein:

the AMF is further configured to transmit a message for requesting an update of the PDU session to the SMF, and the message for requesting the update of the PDU session includes the information regarding the second S-NSSAI.

13. The system of claim 11, wherein the second S-NSSAI is used for performance measurement of the PDU session by the UPF.

14. The system of claim 11, wherein when a third S-NSSAI stored in the UPF and associated with the PDU session is different with the second S-NSSAI, the third S-NSSAI is updated with the second S-NSSAI.

15. The system of claim 11, wherein the information regarding the second S-NSSAI includes an information on a slice/service type (SST) used in a 5th generation system (5GS) and an information on a slice differentiator (SD) used in the 5GS.

* * * * *